(12) United States Patent
Denpo

(10) Patent No.: US 7,382,499 B2
(45) Date of Patent: Jun. 3, 2008

(54) MEDIA ACCESS LAMP

(75) Inventor: Toshiaki Denpo, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 956 days.

(21) Appl. No.: 10/608,483

(22) Filed: Jun. 30, 2003

(65) Prior Publication Data
US 2004/0130732 A1 Jul. 8, 2004

(30) Foreign Application Priority Data
Jan. 8, 2003 (JP) ............................. 2003-000190

(51) Int. Cl.
H04N 1/024 (2006.01)
H04N 1/04 (2006.01)
G06K 15/00 (2006.01)
G08B 21/00 (2006.01)
G06F 12/00 (2006.01)

(52) U.S. Cl. .................. 358/472; 358/474; 358/1.16; 340/540

(58) Field of Classification Search ............... 358/472, 358/474, 1.16; 340/540; 711/163
See application file for complete search history.

(56) References Cited

U.S. PATENT DOCUMENTS

| 4,055,835 | A | * | 10/1977 | Thornton et al. | ........... 379/165 |
|---|---|---|---|---|---|
| 5,485,245 | A | * | 1/1996 | Kobayashi et al. | ............ 399/1 |
| D462,971 | S | | 9/2002 | Leong et al. | |
| 6,564,056 | B1 | * | 5/2003 | Fitzgerald | ................ 455/435.1 |
| 6,588,664 | B2 | * | 7/2003 | Davies | .................. 235/462.01 |
| 7,059,785 | B2 | * | 6/2006 | Kato et al. | ..................... 400/62 |
| 7,277,011 | B2 | * | 10/2007 | Estakhri | ...................... 340/540 |
| 2002/0184539 | A1 | * | 12/2002 | Fukuda et al. | .............. 713/202 |
| 2003/0043404 | A1 | | 3/2003 | Fetherolf et al. | |
| 2003/0093606 | A1 | * | 5/2003 | Mambakkam et al. | ....... 710/305 |
| 2003/0107762 | A1 | * | 6/2003 | Kinoshita et al. | ........... 358/1.15 |
| 2004/0201774 | A1 | * | 10/2004 | Gennetten | .................... 348/375 |

FOREIGN PATENT DOCUMENTS

| JP | A 4-47978 | 2/1992 |
|---|---|---|
| JP | A 5-88429 | 4/1993 |
| JP | A 5-260239 | 10/1993 |

* cited by examiner

Primary Examiner—Houshang Safaipour
(74) Attorney, Agent, or Firm—Oliff & Berridge, PLC

(57) ABSTRACT

A multifunction device including a body, a media slot placed on the body and which receives a media card and a control panel including a media card indicator that illuminates when a media card has been inserted into the media slot, wherein the media card indicator and the media slot are on different planes.

18 Claims, 15 Drawing Sheets

Fig. 6

| CONDITIONS | MEDIA CARD INSERTED | ACCESS LAMP STATUS ||||
|---|---|---|---|---|---|
| | | FAX | COPY | SCAN | PCC |
| DURING POWER-OFF | NO | ○ | ○ | ○ | ○ |
| | YES | ○ | ○ | ○ | ○ |
| DURING FAX MODE | NO | ● | ○ | ○ | ○ |
| | YES | ● | ○ | ○ | ● OR ◎ |
| DURING COPY MODE | NO | ○ | ● | ○ | ○ |
| | YES | ○ | ● | ○ | ● OR ◎ |
| DURING SCAN MODE | NO | ○ | ○ | ● | ○ |
| | YES | ○ | ○ | ● | ● OR ◎ |
| DURING PCC MODE | NO | ○ | ○ | ○ | ○ |
| | YES | ○ | ○ | ○ | ● OR ◎ |

… # MEDIA ACCESS LAMP

BACKGROUND OF THE INVENTION

1. Field of Invention

The invention relates to a media access lamp. In particular, the invention relates to a media access lamp for a multifunction device having a media slot.

2. Description of Related Art

A multifunction device can perform a plurality of tasks including printing, scanning, copying, and faxing, for example. Typically, a document is placed on a scanner and read by the scanner before either copying or faxing the document. A multifunction device is also capable of receiving data from an external source, for example, a personal computer connected to the multifunction device or from a media card inserted into a media slot incorporated into the multifunction device. In order to implement a particular task, a control panel is used to identify the function capabilities of the multifunction device, what function is currently being performed or capable of being performed, and whether an external source, for example, a media card is available. However, determining whether a media card is available is often difficult for an operator.

In order to determine whether a media card is available, i.e., whether a media card has been inserted into the media slot, Japan Laid Open Patent Publication No. 5-260239, for example, discloses a multifunction device with a control panel and media slots. The control panel and the media slots are provided on the same plane on the multifunction device. When a media card has been inserted into the media slot or is being accessed, an indicator lamp is turned on in order to indicate to an operator that the media card has been inserted or is being accessed. Other examples include Japan Laid Open Patent Publication Nos. 5-88429 and 4-47978 which discloses a multifunction device with a media slot provided on a side face with indicator lamps located near the media slot and on the same plane as the media slot. The indicator lamps indicate to an operator whether removal of the media card is allowable. U.S. Design Pat. No. 462,971 disclose a multifunction device with a media slot and an indicator lamp on the front face, below the control panel thereof, and on the same plane.

SUMMARY OF THE INVENTION

However, in the above described multifunction devices, both the media slot and the indicator lamp are both located on the front surface of the multifunction device and on the same plane As such, it is difficult to determine if a media card has been inserted into the media slot based on the position of both the media slot and the indicator lamp on the same plane. Also, an operator can not determine if data is being downloaded from the media card because the indicator lamp is always in the on position when a media card has been inserted into the media slot.

Further, it is difficult for an operator to determine if the media card is being used. An operator is not provided, in the above described multifunction devices, with a function key in order to only access the card. Also, at least one function key for either the copy, fax or scan mode is always on, thus increasing the operator's difficulty in determining if they are downloading data from the media card.

The invention thus provides a multifunction device wherein the media slot and the indicator light that indicates that a media card has been inserted into the media slot are on different planes. In particular, the indicator light is on the operating panel so that the operator can easily determine if a media card has been inserted.

The invention also provides an indicator light, that indicates that a media card has been inserted into the media slot and that blinks when data is being downloaded from the media card. As such, the user can easily determine if data is being downloaded from the media card.

The invention also provides an indicator light, that indicates that a media card has been inserted into the media slot and that functions as a mode selection key. As the media card is inserted into the media slot, the indicator light is turned on. Thereafter, an operator can press the indicator light in order to download data from the media card.

The invention also provides a multifunction device wherein when the indicator light, that indicates that a media card has been inserted into the media slot, is pressed, the indicator lights for faxing, copying and scanning are turned off. As such, an operator can easily determine that faxing, copying and scanning are not being performed.

The invention thus provides, according to a first exemplary aspect of the invention, a multifunction device including a body, a media slot placed on the body and which receives a media card and a control panel including a media card indicator that illuminates when a media card has been inserted into the media slot, wherein the media card indicator and the media slot are on different planes.

The invention also provides, according to a second exemplary aspect of the invention, a multifunction device, including a body, a media slot placed on the body and which receives a media card and a control panel including a media card indicator that illuminates when a media card has been inserted into the media slot, wherein the media card indicator is pressed before an operator downloads and prints data from the media card.

BRIEF DESCRIPTION OF THE DRAWINGS

Various embodiments of the invention will be described with reference to the drawings, wherein:

FIG. 6 is a table illustrating how the statuses of the access lamps are displayed with respect to an operating condition of the multi-function device of FIG. 1;

DETAILED DESCRIPTION OF PREFERRED EMBODIMENTS

Figure 1:
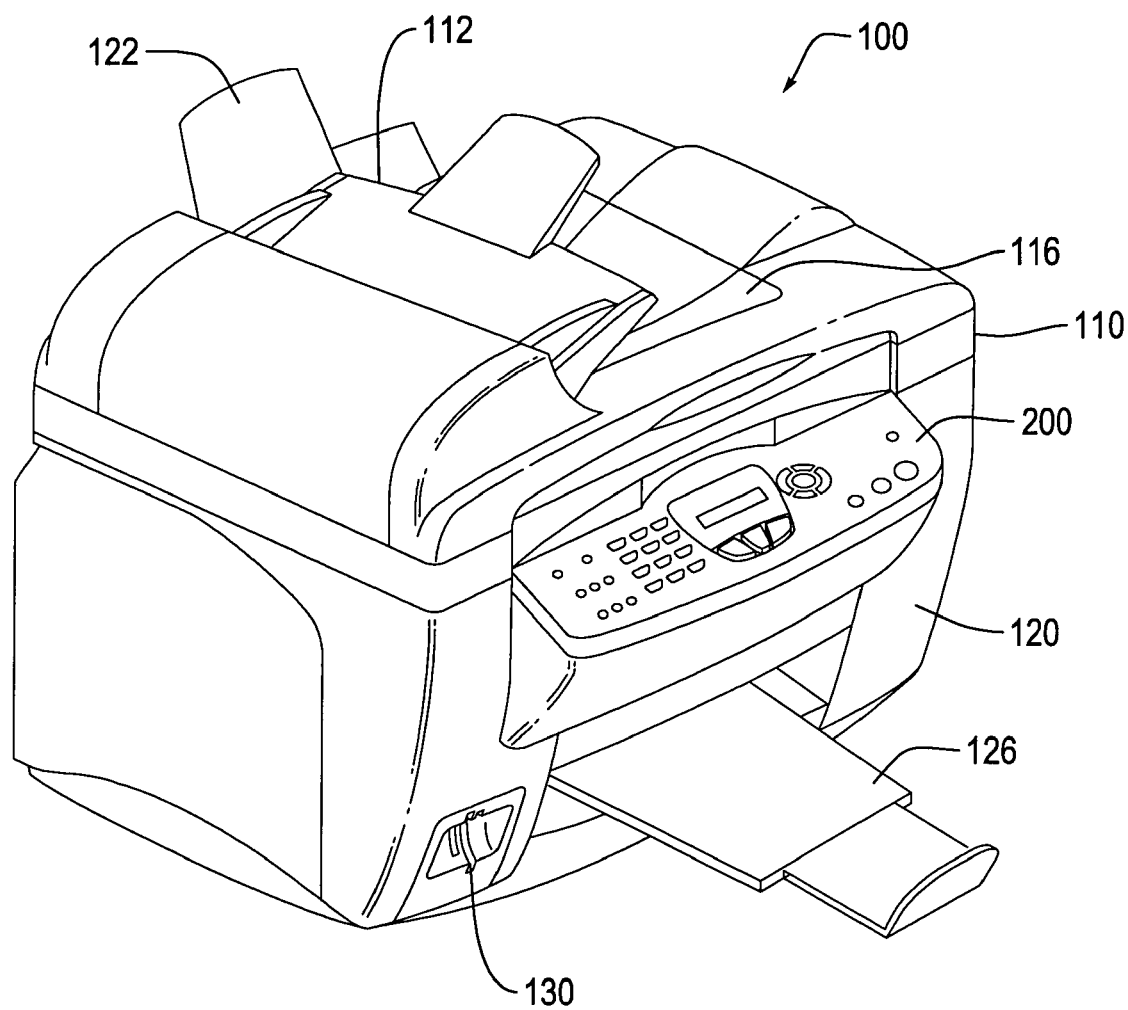
FIG. 1 is a perspective view of a multi-function device according to an embodiment of the invention.
Figure 2:
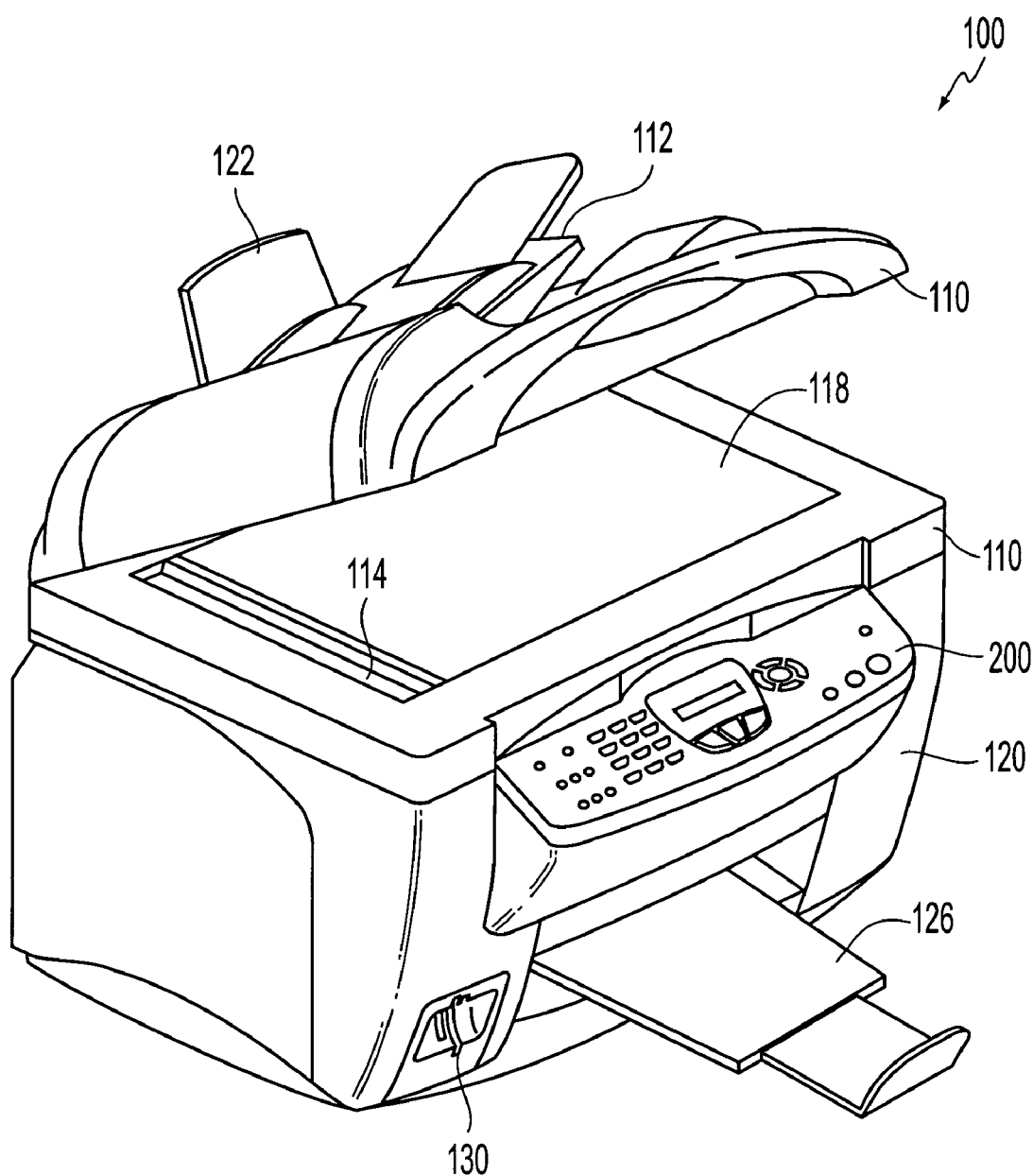
FIG. 2 is a perspective view of the multi-function device of FIG. 1 with a scanner lid in an open position.
Figure 3:
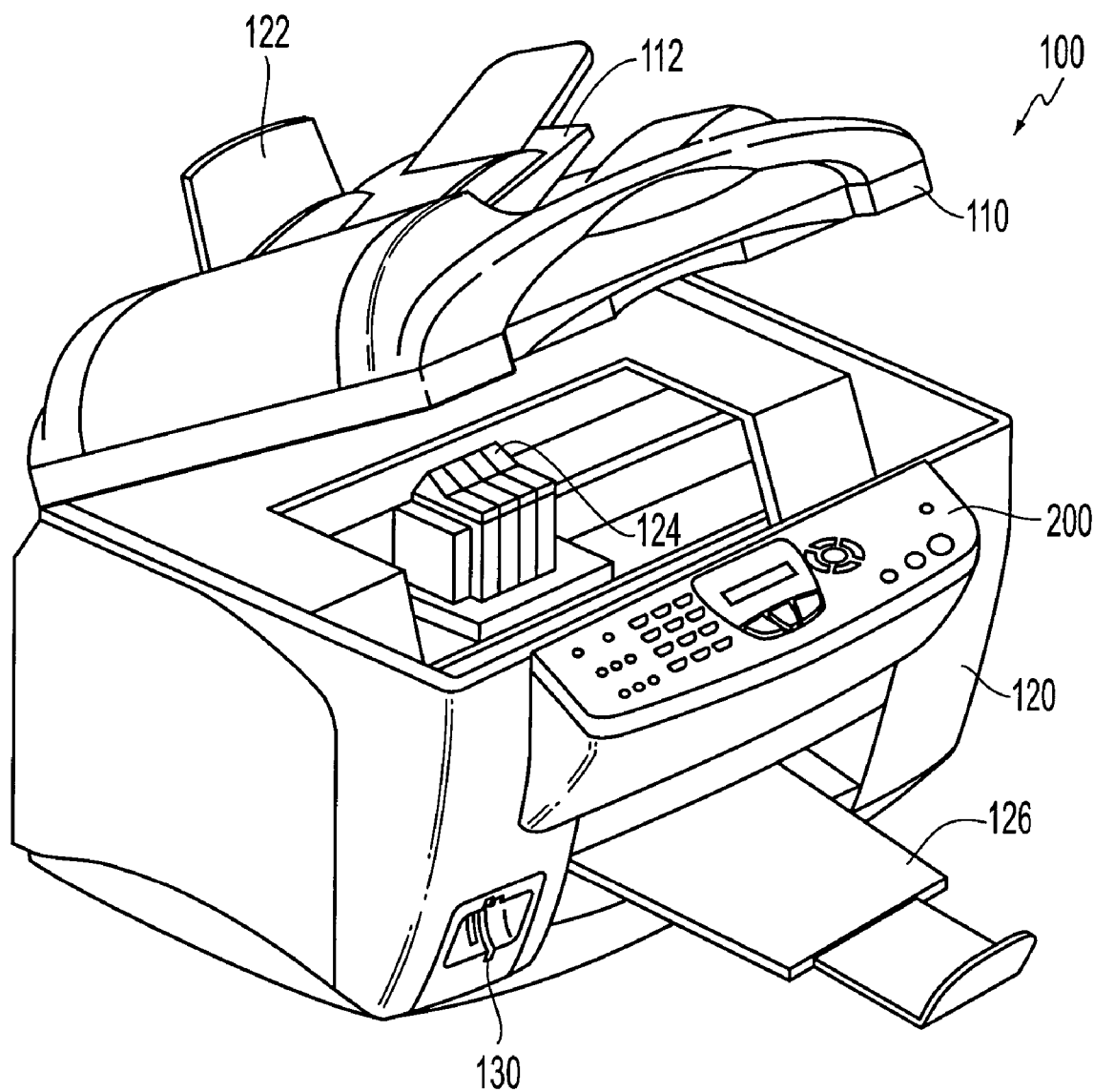
FIG. 3 is a perspective view of the multi-function device of FIG. 1 with a main body of a printer in an open position.

The embodiment of the invention will be described with reference to the accompanying drawings. As shown in FIGS. 1-3, a multifunction device 100 has a facsimile function, a printing function, a copying function and a scanning function. The multifunction device 100 includes a scanner body 110 placed on top of a printer body 120, a media slot 130 placed on the lower front surface of the printer body 120 and an operating panel 200 placed on the upper front surface of the printer body 120 and tilted upward at a predetermined angle relative to the front surface. A side, on which the operating panel 200 is provided, is defined as the front of the multifunction device 100 and the opposite side is defined as a rear of the multifunction device 100. The right and left sides of the multifunction device 100 are defined as right and left, respectively, when viewed from the front of the multifunction device 100.

The scanner body 110 has a rectangular shaped frame and includes a holding tray 112 provided on the upper left side of the scanner body 110. The holding tray 112 holds original documents, which are to be scanned and transmitted in a facsimile mode or which are to be scanned and reproduced in a copy mode. The original documents placed on the holding tray 112 are conveyed to a scanning unit (not shown) provided in the scanner body 110 and surfaces of the original documents are scanned by the scanning unit when crossing a first reading position 114 (FIG. 2). Then, the scanned documents are ejected onto a discharge tray 116 provided at the right upper side of the scanner body 110. Alternatively, separate sheets of documents can be placed on the second reading position 118 (FIG. 2) and thereafter scanned by the scanning unit.

The printer body 120 has a box shaped frame and includes a supply tray 122, on which a stack of recording sheets are loaded, provided at the rear of the printer body 120. The sheets placed on the supply tray 122 are conveyed, one by one, to a color ink-jet type image forming unit 124 (FIG. 3) provided in the printer body 120. At the image forming unit 124, predetermined images are printed onto the sheets, and then, the sheets are ejected onto a discharge tray 126. The printer is not limited to the ink-jet type, but can be other types, for example, a laser printing type using toner or a thermal transfer type using an ink ribbon.

Figure 4:
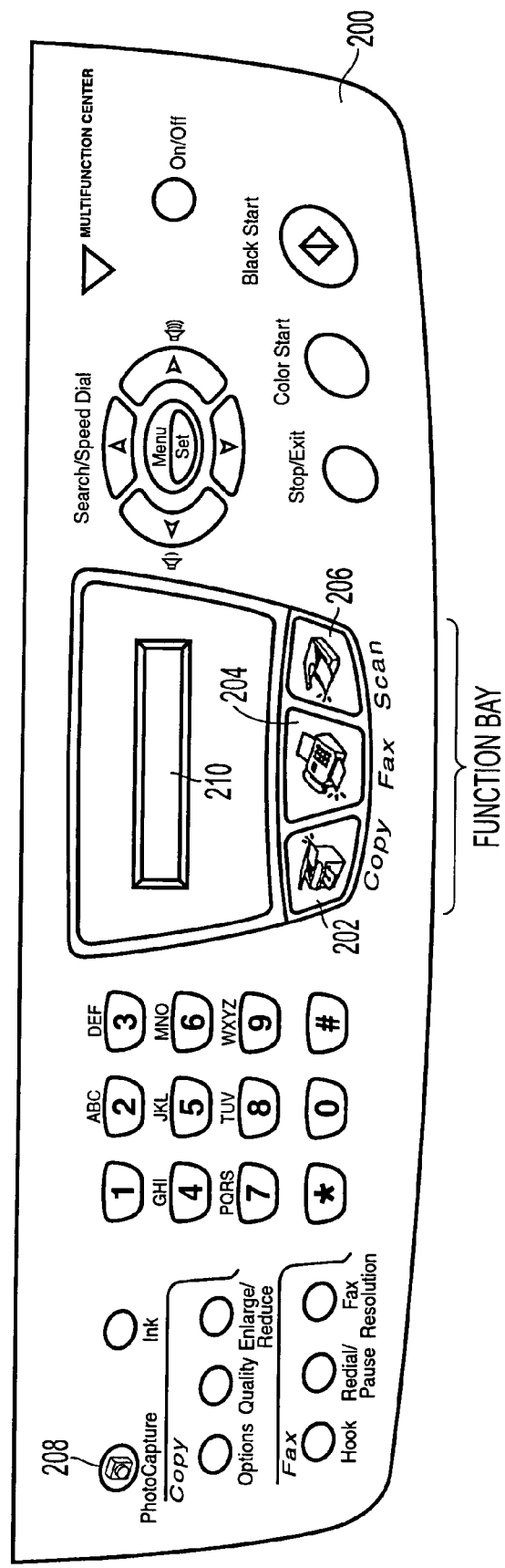
FIG. 4 is an enlarged view of a control panel of the multi-function device of FIG. 1.

The operating panel 200 as shown in FIGS. 1 and 4 is attached to the upper front surface of the printer body 120 frame and is tilted upward at a predetermined angle relative to the front surface. The operating panel 200 is tilted at the predetermined angle so that a front face of the operating panel 200 faces upward toward the operator. By tilting the operating panel 200 upward, the operator can easily view the operating panel 200. The operating panel 200 is provided with various buttons and/or keys, such as a start button, numeric (0 to 9) buttons and function keys. By pressing the buttons and keys, various operations are performed.

In particular, as shown in FIG. 4, the operating panel 200 includes a copy function key 202 that places the multifunction device 100 in a copy mode, a fax function key 204 that places the multifunction device 100 in a facsimile mode, a scan function key 206 that places the multifunction device 100 in a scanning mode and a photocapture function key 208 that places the multifunction device 100 in a photocapture copying (Pcc) mode. Associated with each function key 202-208 is an access lamp. The access lamps illuminate in order to indicate to an operator the current mode of the multifunction device 100 to be described later.

The function keys 202-208 are not limited to using an access lamp, but can be any device that provides illumination in order for an operator to observe the current of the multifunction device 100. The multifunction device 100 is also not limited to using illumination. Any external notification, including varying audible tones, can be used in order to notify the operator of the current mode of the multifunction device 100.

Furthermore, the access lamp for the photocapture function key 208 is not limited to indicating that the multifunction device 100 is in a Pcc mode but can be used as a message indication lamp. For example, a control panel printed circuit board may be shared among a plurality of multifunction devices 100 having the photocapture function key 208. The control panel printed circuit board can thus accommodate a product line-up by using the photocapture function key 208 as an incoming message indication lamp.

As shown in FIG. 4, the copy function key 202, fax function key 204 and the scan function key 206 are shown in order from right to left. However, the multifunction device 100 is not limited to this arrangement. The function keys 202-206 can be arranged such that a least used function key is a middle function key. For example, if an operator does not connect the multifunction device 100 to an external source, the facsimile function cannot be utilized because data cannot be transmitted. The fax function thus would be used less than the copy function and the scan function. As such, the fax function key 204 can be arranged between the copy function key 202 and the scan function key 206. With this arrangement, the copy function key 202 and the scan function key 206 would thus be separated. Operator error would be reduced in erroneously pressing the copy function key 202 or the scan function key 206 because of the separation.

Figure 14:
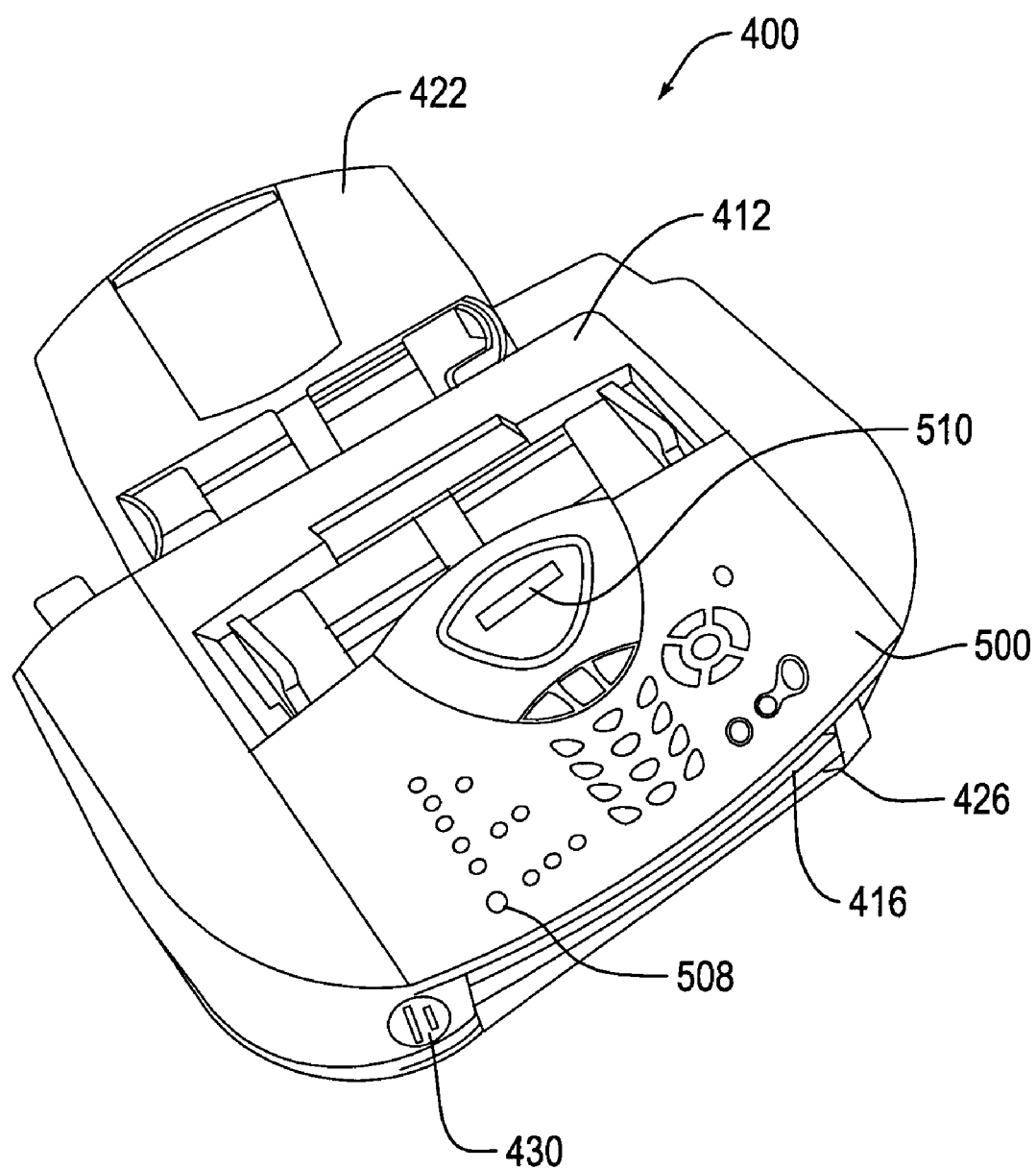
FIG. 14 is a perspective view of a multi-function device according to another embodiment of the invention.
Figure 15:
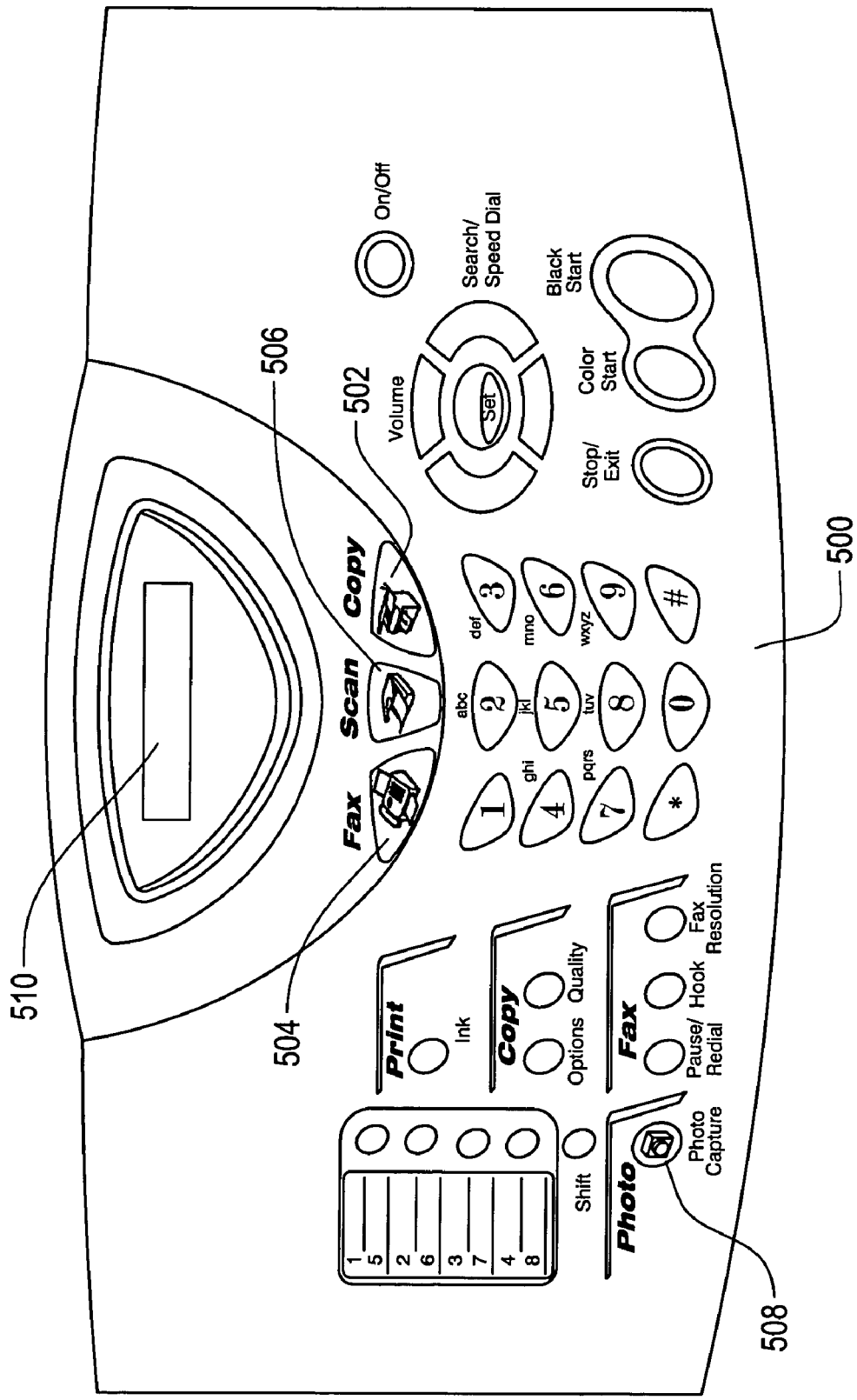
FIG. 15 is an enlarged view of another control panel of the multi-function device of FIG. 14.

As should be appreciated, the multifunction device 100 of FIG. 1 is a flat bed (FB) model. FIG. 14 is a perspective view of a multi-function device 400 according to another embodiment of the invention and FIG. 15 is an enlarged view of the operating panel 500 used in the multifunction device 400. As should be appreciated, the multifunction device 400 is an auto-document feeder (ADF) model.

The multifunction device 400 has a facsimile function, a printing function, a copying function and a scanning function. The multifunction device 400 includes a holding tray 412, a supply tray 422, a document discharge port 416, a sheet discharge port 426, a media slot 430 and an operating panel 500. The holding tray 412 holds original documents which are to be scanned an transmitted in a facsimile mode or which are to be scanned and reproduced in a copy mode. The original documents placed on the holding tray 412 are conveyed to a scanning unit (not shown) where images on the original documents are scanned. The scanned documents are ejected onto the document discharge port 416. The supply tray 422 is disposed at the rear of the multifunction device 400 for mounting a stack of recording sheets thereon. The sheets placed on the supply stray 422 are conveyed, one by one, to an image forming unit (not shown) where images are printed on the sheets. The printed sheets are ejected onto the sheet discharge port 426. The operating panel 500 includes various buttons and/or keys, such as a start button, numeric (0 to 9) keys, and function keys. The media slot 430 is provided in the front side of the multifunction device 400.

As shown in FIG. 15, the operating panel 500 includes a liquid crystal display (LCD) 510 that displays various data, a copy function key 502 that places the multifunction device 400 in a copy mode, a fax function key 504 that places the multifunction device 400 in a fax mode, a scan function key 506 that places the multifunction device 400 in a scan mode, and a photocapture function key 508 that places the multifunction device 400 in a photocapture copying (Pcc) mode.

An example of the arrangement of the copy function key, fax function key and the scan function key for the models is as follows:

| FB model | Copy Function Key | Fax Function Key | Scan Function Key |
|---|---|---|---|
| ADF model | Fax Function Key | Scan Function Key | Copy Function Key |

For low end FB and ADF models, the fax function key and the scan function key can be eliminated, respectively, if a respective fax operation and scan operation is not going to be performed. Manufacturing costs can thus be reduced by selectively disposing of the respective function keys if the respective function is not used. Furthermore, costs of the machine can be reduced because the same function keys can be used in the models having two function keys and three function keys. Also, a space between the two remaining function keys would remain in order to reduce operator error in erroneously pressing the wrong function key.

The multifunction device can also be arranged to move a function key. Using the above example, if a fax function is not utilized, the fax function key can be removed from the middle of the function keys. There would again be some separation between the copy function key and the scan function key. Further, costs can be reduced in removing the unused function key.

Returning to the multifunction device 100 of FIGS. 1-3, the operating panel 200 also includes a liquid crystal display (LCD) 210. The LCD 210 displays various data to an operator that pertains to a particular mode. For example, during the fax mode, the LCD 210 displays information relevant to performing a fax function, including but not limited to, displaying the date, time and that the multifunction device 100 is in a fax mode. Similarly, while in the copy, scanning and Pcc modes, the LCD 210 displays information relevant to performing that particular mode.

When the operator initially presses either the copy function key 200, the fax function key 204, a scan function key 206 or the photocapture function key 208, the LCD 210 displays a respective standby screen. The operator can then adjust the settings for a particular mode to fit a particular operation. For example, while in the copy mode, the operator can select a particular scale, number of copies or quality. After a predetermined period of time after copying is performed or the setting for copying have changed or if a copy operation is cancelled, the LCD 210 returns to the standby screen. However, if an error occurs during copying, a return is not made to the standby screen and an error message remains displayed on the LCD 210.

Figure 5:
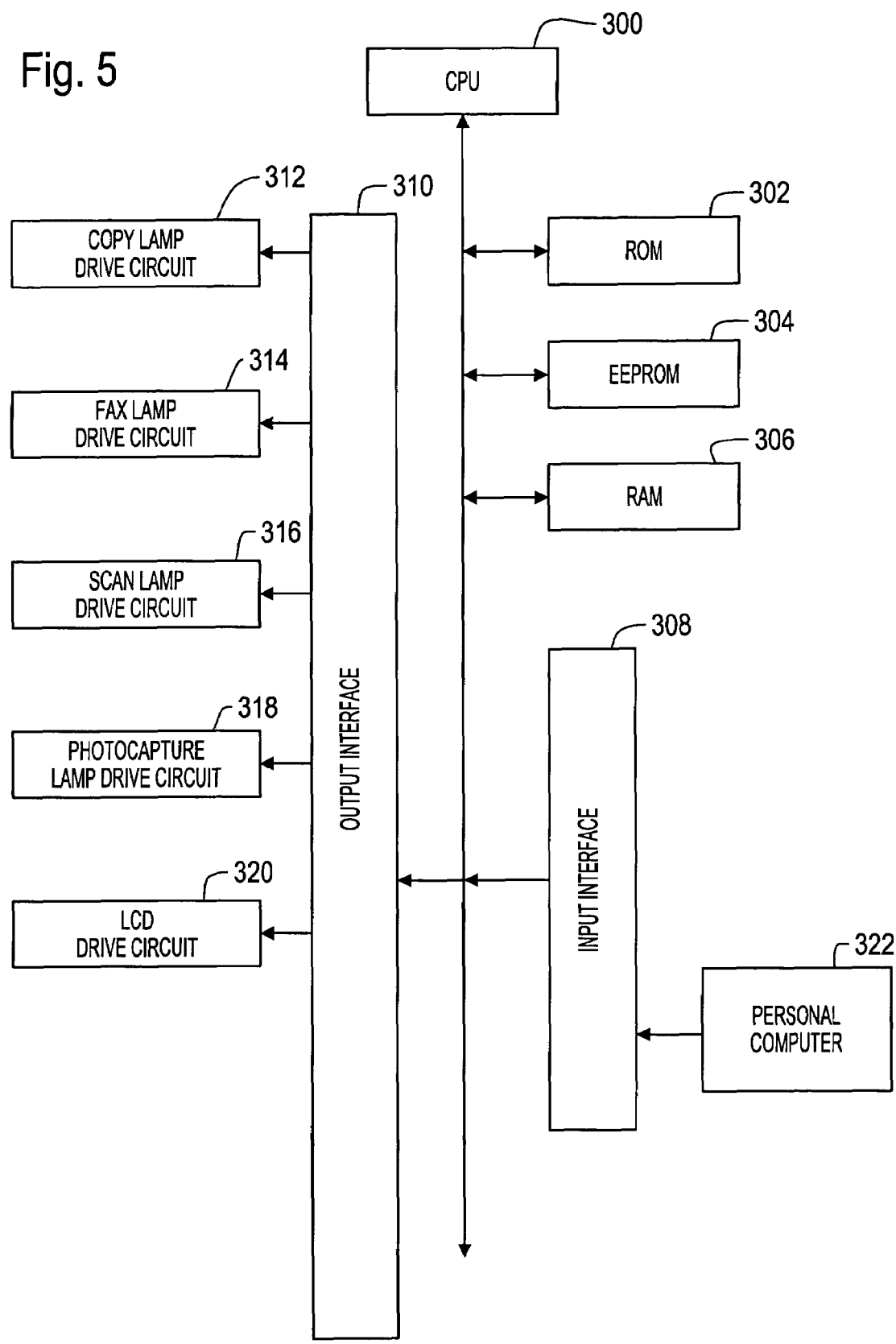
FIG. 5 is a schematic block diagram showing a control system of the multi-function device of FIG. 1.

As shown in FIG. 5, a control system of the multifunction device 100 includes a CPU 300, a ROM 302, an EEPROM 304, a RAM 206, an input interface 308, and an output interface 310. The output interface 310 is connected to a copy lamp drive circuit 312, a fax lamp drive circuit 314, a scan lamp drive circuit 316, a photocapture lamp drive circuit 318 and an LCD drive circuit 320. The copy lamp drive circuit 312 turns on the access lamp for the copy function key 202, the fax lamp drive circuit 314 turns on the access lamp for the fax function key 204, the scan lamp drive circuit 316 turns on the access lamp for the scan function key 206 and the photocapture lamp drive circuit 318 turns on the access lamp for the photocapture function key 208. Furthermore, the LCD drive circuit 320 turns on the LCD 210 and provides display data for display on the LCD 210.

FIG. 6 is a table illustrating how the current mode of the multifunction device 100 is displayed using the access lamps associated with each of the function keys 202-208. ○ indicates that an access lamp is turned off, ● indicates that an access lamp is turned on, and ⊙ indicates that an access lamp is blinking.

As shown in FIG. 6, when the multifunction device 100 has been turned off or the multifunction device 100 is in a power-saving mode (i.e., during power-off), none of the access lamps for the function keys 202-208 are turned on. When the multifunction device 100 has been turned on and either the fax function key 204, the copy function key 202, or the scan function key 206 has been pressed, the multifunction device 100 is placed in that particular mode and the access lamp for the selected function key that has been pressed is turned on. Furthermore, the respective access lamp for the originally selected function key that has been pressed is not turned off and another access lamp for another selected function key is not turned on until after an operation associated with the original function key has been completed. In other words, the multifunction device 100 does not change modes until after a particular operation has been completed and the multifunction device 100 is placed in the standby mode. A different access lamp indicating a different mode is thus not turned on until after or currently with the changing of modes.

For example, when the multifunction device 100 has been turned on and the fax function key 204 has been pressed, the access lamp for the fax function key 204 is turned on. If an operator then presses either the copy function key 202 or the scan function key 206, the access lamp for the copy function key 202 or the scan function key 206 is not turned on and the access lamp for the fax function key 204 is not turned off until after performing the fax operation.

The multifunction device 100 is not limited to waiting until after a particular operation has been completed in order to change modes and to change the illumination of an access lamp. Modes changes can be prevented when functions initiated by an external source using the multifunction device 100 is performed. For example, mode changes are prevented when the multifunction device 100 is operated using an incoming instruction from a telephone line or from a personal computer. The operator can thus determine if the multifunction device 100 is in a particular mode and whether the multifunction device 100 can perform a fax, copy or scan operation based on the illumination of a respective function key.

When a media card has not been placed in the media slot 130, the access lamp for the photocapture function key 208 is turned off. The operator can thus determine that the media card has not been place in the media slot 130 and that a photocapture operation can not be performed when the access lamp for the photocapture function key 208 has been turned off.

When a media card has been placed in the media slot 130, the access lamp for the photocapture function key 208 is initially turned on. If either of the access lamps for either of the fax function key 204, the copy function key 202 or the scan function key 206 is on, the photocapture function key 208 is also turned on. The access lamp for the photocapture function key 208 is also turned on even if the multifunction device 100 is currently operating in a fax, scan or copy mode, i.e., the multifunction device 100 is not in a standby mode. The operator can thus determine that a media card has been placed in the media slot 130 and that a photocapture operation can be performed.

When the photocapture function key 208 has been pressed, all of the other function keys 202-206 are turned off. As such, the operator can determine that the multifunction device 100 is only in the Pcc mode, where data can be downloaded from the media card. The operator can thus determine that the multifunction device 100 is not in any of the other modes. However, like the fax, copy and scan modes, the access lamps for the function keys 202-206 is not turned off indicating that the multifunction device 100 is not in that particular mode until after the respective operation has been completed.

When the operator presses the photocapture function key 208, the multifunction device 100 is placed in the Pcc mode. When in the Pcc mode, the multifunction device 100 can directly print data downloaded from the media card. When the operator presses the photocaputure function key 208, the operator can easily determine that the multifunction device 100 is only printing data downloaded from the media card because only the access lamp for the photocapture function key 208 is on. The access lamp for the photocapture function key 208 blinks (i.e., the access lamp is repeatedly turned on/off) when data is being downloaded and printed from the media card. As such, the operator can also easily determine that the multifunction device 100 is currently printing data downloaded from the media card during the Pcc mode.

If the photocapture function key 208 has not been pressed and the multifunction device 100 is not in the Pcc mode, an external device such as a personal computer can access the media card regardless of the mode of the multifunction device 100. When an external device is downloading data from the media card and the multifunction device 100 is not in the Pcc mode, the access lamp for the photocapture function key 208 blinks. For example, as shown in FIG. 6, when the multifunction device 100 is in a fax mode and data is being downloaded from the media card by a personal computer, the access lamp for the photocapture function key 208 blinks. As should be appreciated, the multifunction device 100 is not automatically placed in the Pcc mode. As such, the operator can determine that the multifunction device 100 is in a fax mode and not a Pcc mode because the access lamp for the fax function key 204 remains on.

Figure 7:
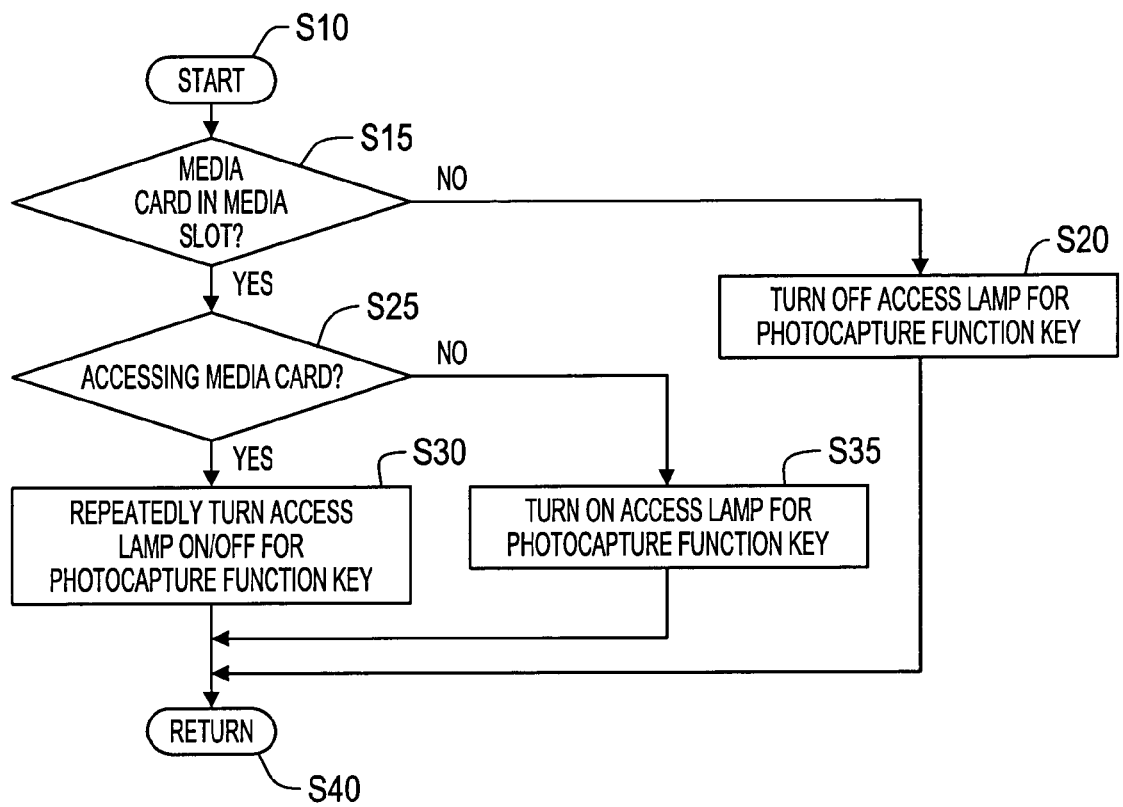
FIG. 7 is a flowchart outlining the media card confirmation processing of the multi-function device of FIG. 1.

FIG. 7 illustrates a method of operating the access lamp for the photocapture function key 208. The method of FIG. 7 is cyclically performed regardless of whether the multifunction device 100 is in another modes or performing an operation in another mode.

The operation begins at step S10 and proceeds to Step S15 where a determination is made as to whether a media card has been inserted into the media slot 130. If a media card has not been inserted into the media slot 130 (S15:No), the operation proceeds to step S20 where the access lamp for the photocapture function key 208 is turned off. Otherwise, (S15:Yes), the operation proceeds to step S25.

In step S25, after it has been determined that a media card has been inserted into the media slot, a determination is then made as to whether data is being downloaded from the media card. If data is not being downloaded from a media card (S25:No), the operation proceeds to step S35. In step S35, the access lamp for the photocapture function key 208 is turned on. Otherwise, (S25:Yes), if data is being downloaded from the media card, the operation proceeds to step S30. In step S30, the access lamp for the photocapture function key 208 blinks. The operation then returns at step S40.

FIGS. 8-13 illustrate the overall processing of the multifunction device 100. In particular, FIGS. 8-13 illustrate how the multifunction device 100 switches between a fax mode, a copy mode, a scan mode and a Pcc mode.

Figure 8:
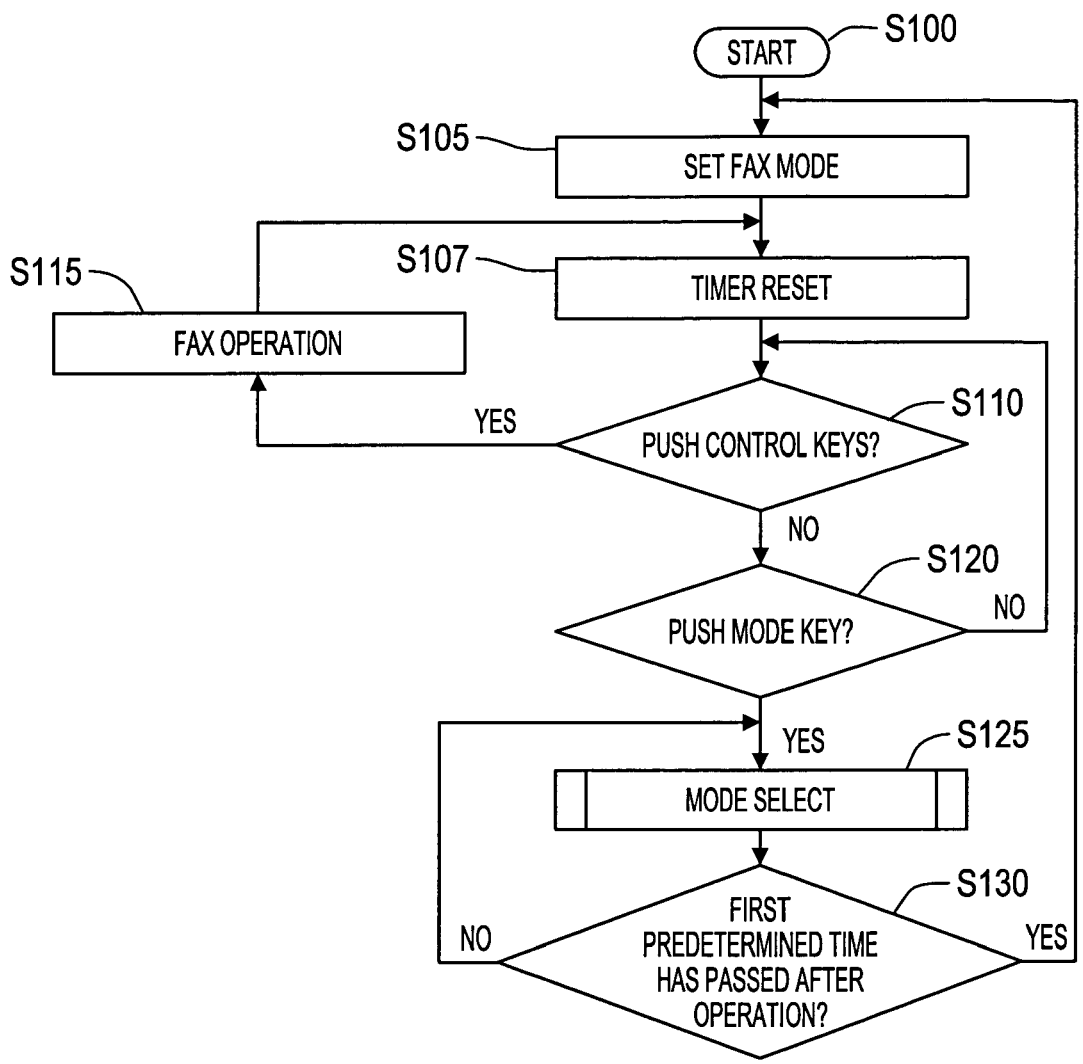
FIG. 8 is a flowchart of the overall processing executed by the multi-function device of FIG. 1.

The operation begins at step S100 of FIG. 8 when the multifunction device 100 has been turned on or when the multifunction device 100 has been taken out of a power saving mode. The operation proceeds to step S105 where the multifunction device 100 is placed in an initial mode. In this embodiment, the multifunction device 100 is initially placed in the fax mode and the access lamp for the fax function key 204 is turned on. However, the multifunction device 100 is not limited to this initial mode and can be initially placed in the copy mode or the scan mode or the Pcc mode if a media card has been placed in the media slot 130. The operation then proceeds to step S107 where a timer is reset to zero. Initially, when the multifunction device 100 has been turned on or when the multifunction device 100 has been taken out of a power saving mode, the timer should be zero. The operation proceeds to step S110.

In step S110, a determination is made as to whether any of the control keys on the operating panel 210, excluding the copy function key 202, the fax function key 204, the scan copy key 206 and the photocapture function key 208, has been pressed. In other words, a determination is made as to whether an operator wants to fax a document based on the pressing of the ten-numbered keys, a Search/Speed Dial key and a start button provided on the operating panel 200. If the operator presses the control keys (S110:Yes), the operation proceeds to step S115 where a fax operation is performed. After performing a fax operation, the operation returns to step S107 where the timer is reset to zero. Otherwise, (S110:No), the operation proceeds to step S120 even if the fax function key 204 has been pressed.

In step S120, a determination is made as to whether a function key 202-208 (i.e. a mode key) has been pressed. If a function key 202-208 has not been pressed (S120:No), the operation returns to step S110. Otherwise, (S120:Yes), the operation proceeds to step S125 in order to select a particular mode.

Figure 9:
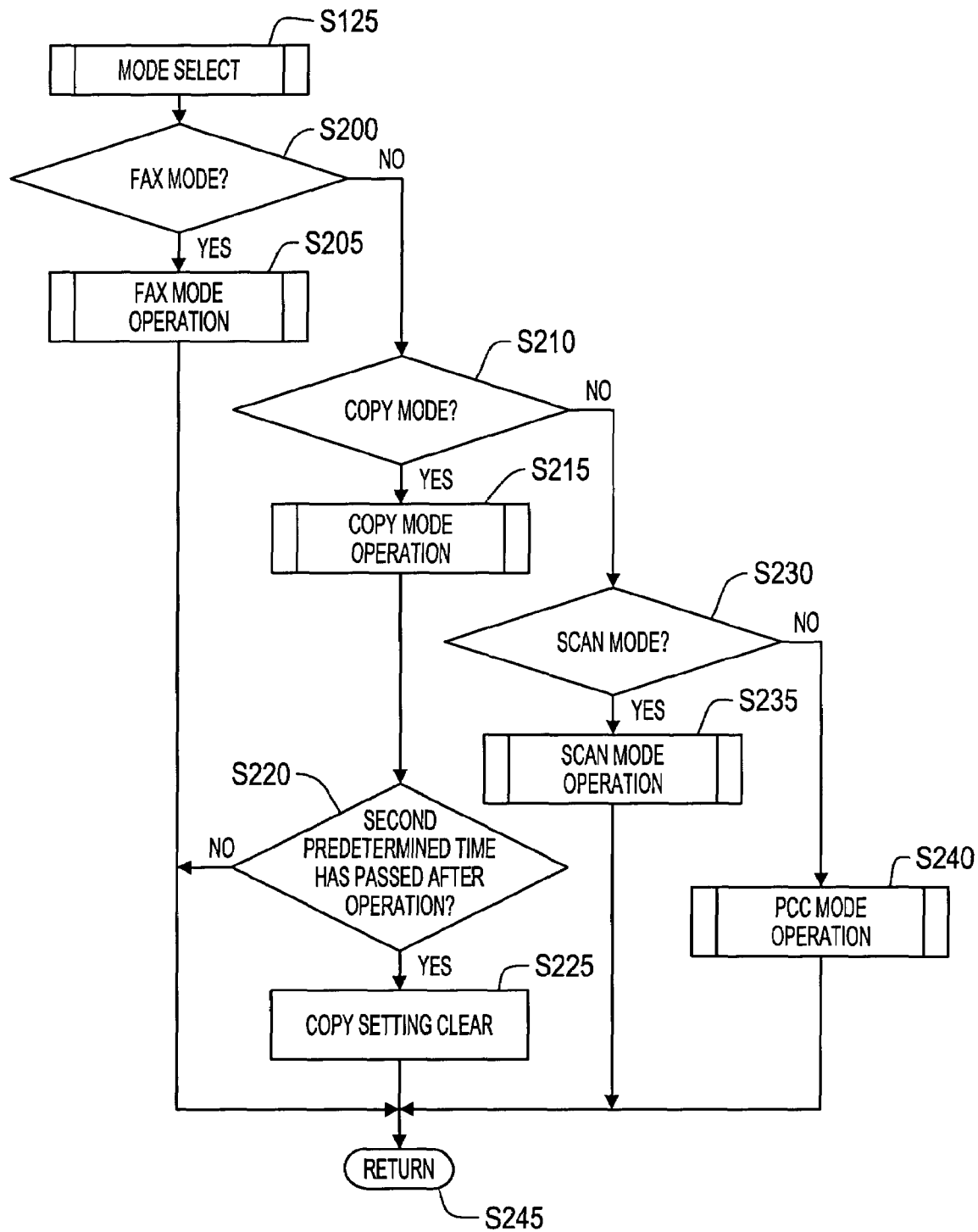
FIG. 9 is a flowchart outlining the mode selection processing performed in the overall processing of FIG. 8.

FIG. 9 illustrates a subroutine used to select the particular mode of step S125. The operation proceeds to step S200 where a determination is made as to whether the fax function key 204 was pressed in order to place the multifunction device 100 in the fax mode. If the fax function key 204 was pressed (S200:Yes), the operation proceeds to step S205 where a fax mode operation is performed. Otherwise, the operation proceeds to step S210.

Figure 10:
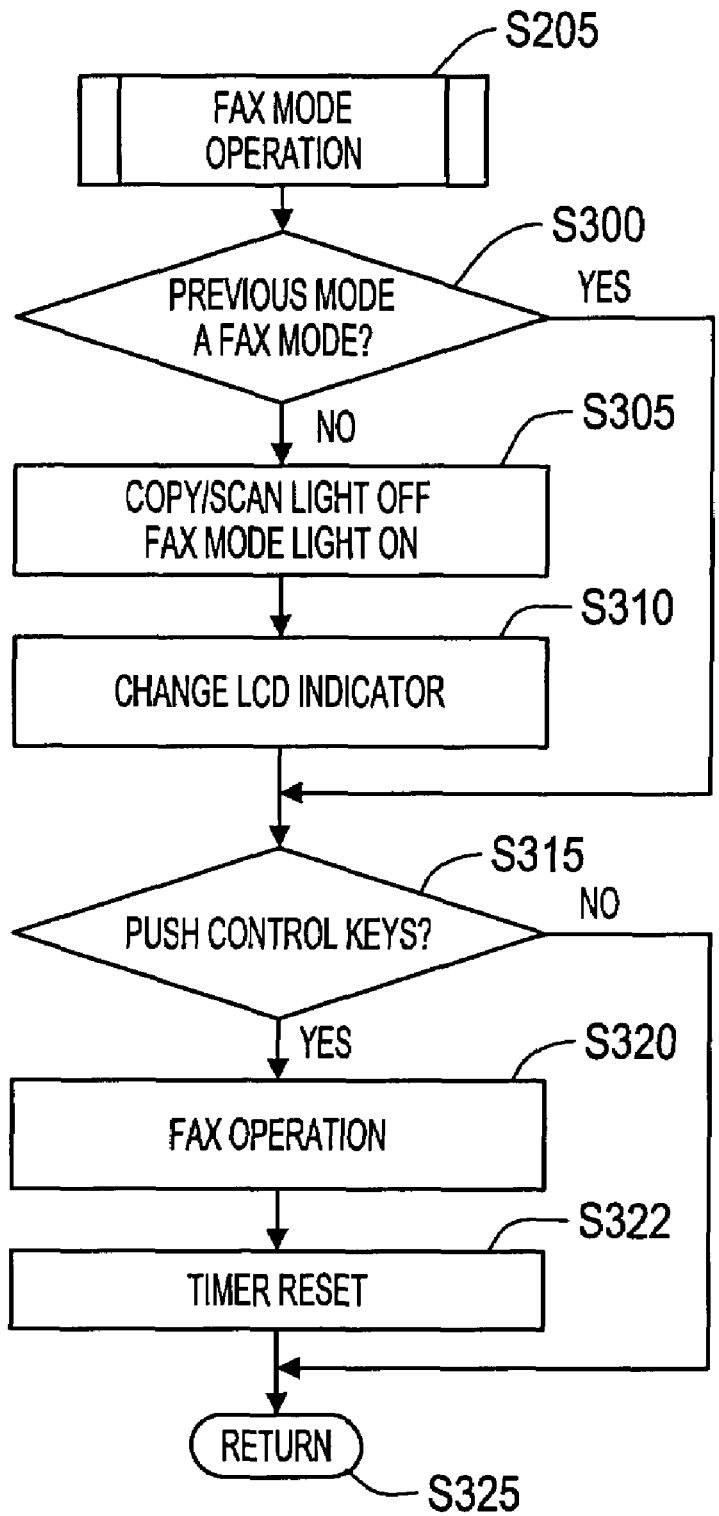
FIG. 10 is a flowchart outlining the facsimile processing performed in the mode selection processing of FIG. 9.

FIG. 10 illustrates a subroutine used to perform the fax mode operation of step S205. The operation proceeds to step S300 where a determination is made as to whether the multifunction device 100 was previously in a fax mode. If the multifunction device 100 was previously in the fax mode (S300:Yes), the operation proceeds to step S315. Otherwise the operation proceeds to step S305. In other words, if the multifunction device 100 was previously in the copy mode, the scan mode or the Pcc mode, it is determined that the multifunction device 100 was not previously in a fax mode and the operation proceeds to step S305.

In step S305, the access lights for the copy function key 202 and the scan function key 206 are turned off, if either one was previously turned on, and the access light for the fax function key 204 is turned on. As should be appreciated, the access light for the photocapture function key 208 is not effected because, as discussed with FIG. 7, this access light is controlled based on the availability of a media card and whether data is being downloaded from a media card. Then, in step S310, the LCD 210 is changed to display data relevant to the fax mode. The operation then proceeds to step S315.

In step S315, a determination is made as to whether any of the control keys on the operating panel 210, excluding the copy function key 202, the fax function key 204, the scan copy key 206 and the photocapture function key 208, have been pressed in order to initiate a fax operation. In other words, a determination is made as to whether an operator wants to fax a document. If the operator presses the control keys (S315:Yes), the operation proceeds to step S320 where a fax operation is performed. Then, in step S322, the timer is reset to zero. Otherwise, (S315:No), the operation returns at step S325 to FIG. 9, where the operation returns at step S245 to step S130 of FIG. 8.

Returning to step S210 of FIG. 9, a determination is made as to whether the copy function key 202 was pressed in order to place the multifunction device 110 in a copy mode. If the copy function key 202 was pressed (S210:Yes), the operation proceeds to step S215 where a copy mode operation is performed. Otherwise, the operation proceeds to step S230.

Figure 11:
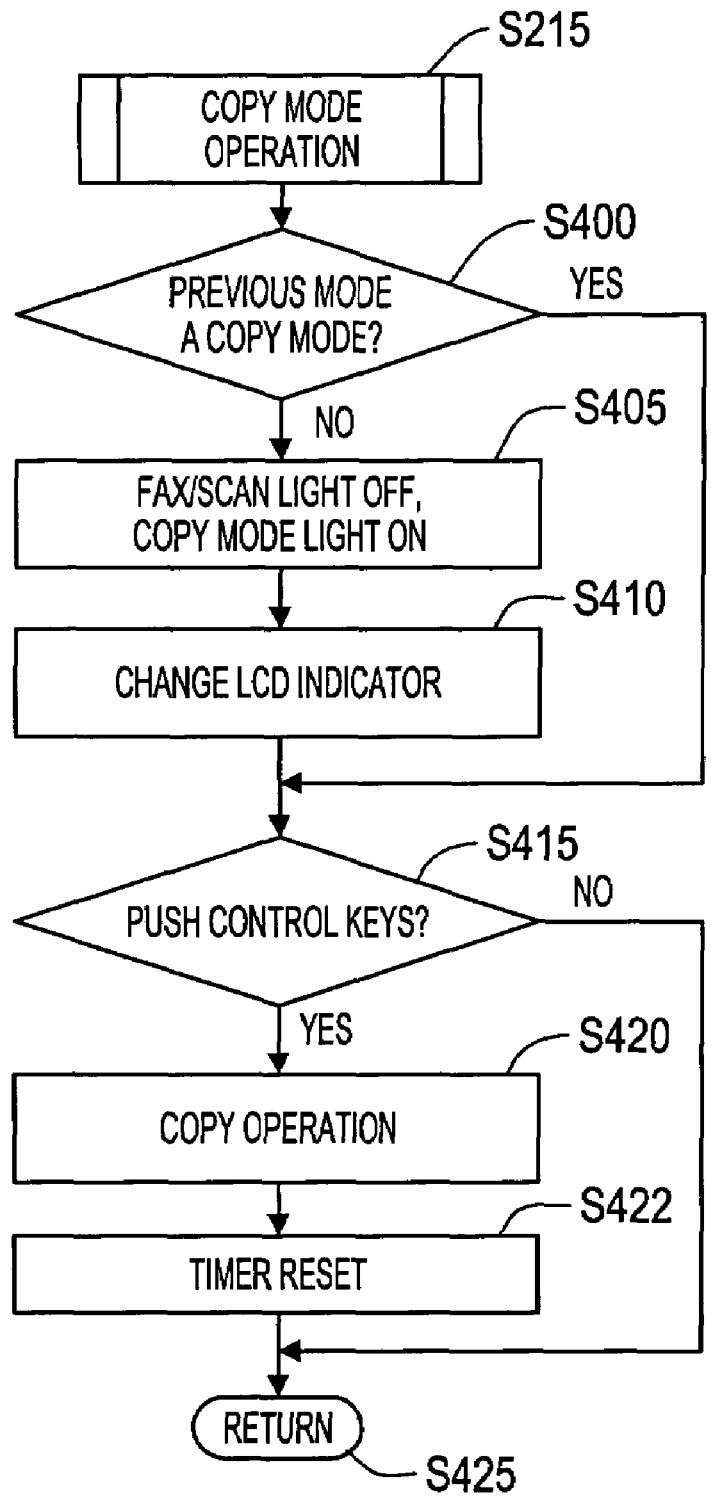
FIG. 11 is a flowchart outlining the copying processing performed in the mode selection processing of FIG. 9.

FIG. 11 illustrates a subroutine used to perform the copy mode operation of step S215. The operation proceeds to step S400 where a determination is made as to whether the multifunction device 100 was previously in a copy mode. If the multifunction device 100 was previously in the copy mode (S400:Yes), the operation proceeds to step S415. Otherwise the operation proceeds to step S405.

In step S405, the access lights for the fax function key 204 and the scan function key 206 are turned off, if either one was previously turned on, and the access light for the copy function key 202 is turned on. As should be appreciated, the access light for the photocapture function key 208 is not effected because, as discussed with FIG. 7, this access light is controlled based on the availability of a media card and whether data is being downloaded from a media card. Then, in step S410, the LCD 210 is changed to display data relevant to the copy mode. The operation then proceeds to step S415.

In step S415, a determination is made as to whether any of the control keys on the operating panel 210, excluding the copy function key 202, the fax function key 204, the scan copy key 206 and the photocapture function key 208, have been pressed in order to initiate a copy operation. In other words, a determination is made as to whether an operator wants to copy a document. If the operator presses the control keys (S415:Yes), the operation proceeds to step S420 where a copy operation is performed. Then, in step S422, the timer is reset to zero. Otherwise, (S415:No), the operation returns at step S425 to step S220 of FIG. 9.

In step S220, a determination is made as to whether a second predetermined time has passed after either initially entering the copy or performing a copy operation. In other words, a determination is made as to whether the timer has reached the second predetermined time. As should be appreciated, when an operator is in the copy mode, a user will adjust the standard copy settings. For example, the user will either adjust the paper size, scale, copy quality, and the time after the copy settings are made. If a copy operation has been performed within a second predetermined period of time (S220:No), the operation returns at step S245. Otherwise (S220:Yes), the operation proceeds to step S225. In step S225, the copy settings are reset to the default copy settings. The operation then returns at step S245.

Returning to step S230 of FIG. 9, a determination is made as to whether the scan function key 206 was pressed in order to place the multifunction device in a scan mode. If the scan function key 202 was pressed (S230:Yes), the operation proceeds to step S235 where a copy mode operation is performed. Otherwise, the operation proceeds to step S240.

Figure 12:
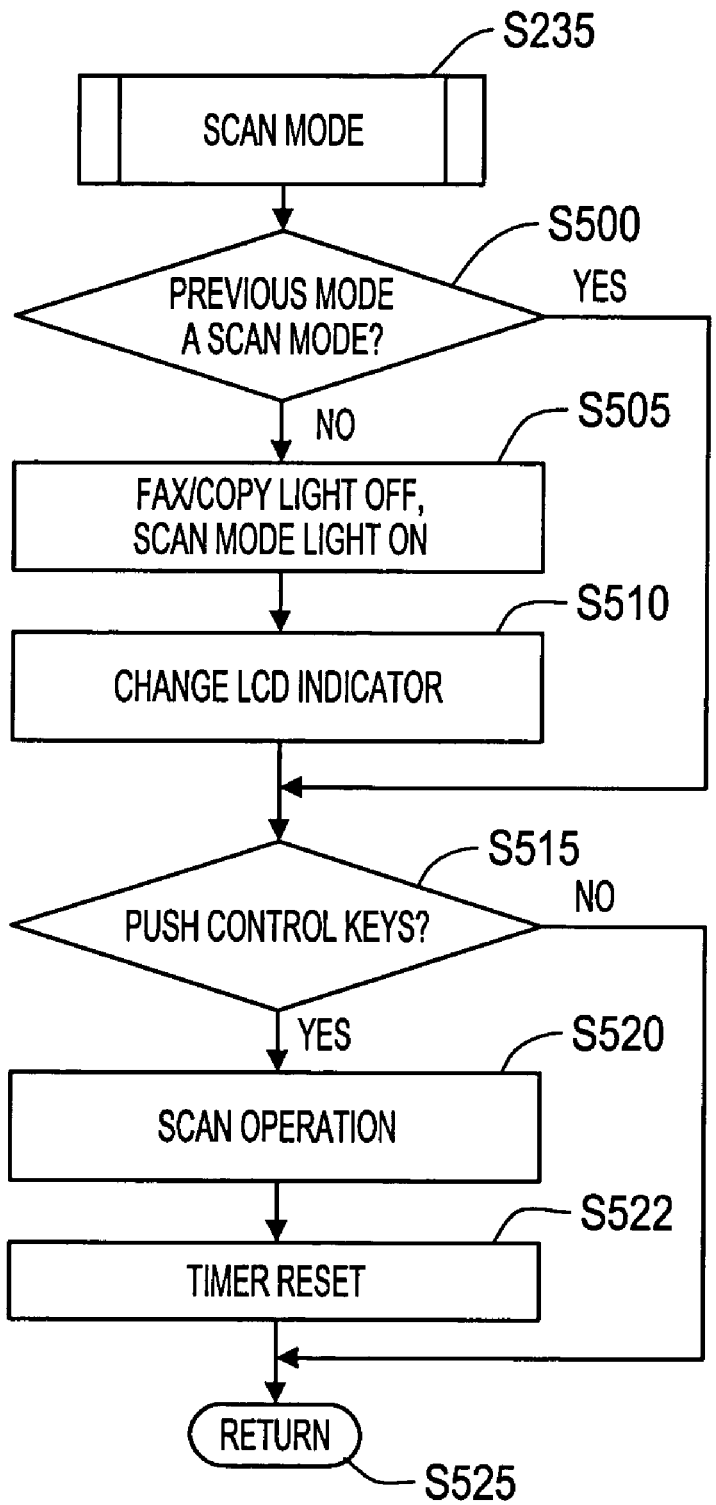
FIG. 12 is a flowchart outlining the scan processing performed in the mode selection processing of FIG. 9.

FIG. 12 illustrates a subroutine used to perform the scan mode operation of step S235. The operation proceeds to step S500 where a determination is made as to whether the multifunction device 100 was previously in a scan mode. If the multifunction device 100 was previously in the scan mode (S500:Yes), the operation proceeds to step S515. Otherwise the operation proceeds to step S505.

In step S505, the access lights for the fax function key 204 and the copy function key 202 are turned off, if either one was previously turned on, and the access light for the scan function key 206 is turned on. As should be appreciated, the access light for the photocapture function key 208 is not effected because, as discussed with FIG. 7, this access light is controlled based on the availability of a media card and whether data is being downloaded from a media card. Then, in step S510, the LCD 210 is changed to display data relevant to the scan mode. The operation then proceeds to step S515.

In step S515, a determination is made as to whether any of the control keys on the operating panel 210, excluding the copy function key 202, the fax function key 204, the scan copy key 206 and the photocapture function key 208, have been pressed in order to initiate a scan operation. In other words, a determination is made as to whether an operator wants to scan a document. If the operator presses the control keys (S515:Yes), the operation proceeds to step S520 where a scan operation is performed. Then, in step S522, the timer is reset to zero. Otherwise, (S515:No), the operation returns at step S525 to step S245 of FIG. 9.

Returning to step S240, after it has been determined that none of the function keys 202-206 have been pressed, it is determined that the photocapture function key 208 has been pressed in order to place the multifunction device 100 in the Pcc mode. The operation thus proceeds to S240 where a Pcc mode operation is performed.

Figure 13:
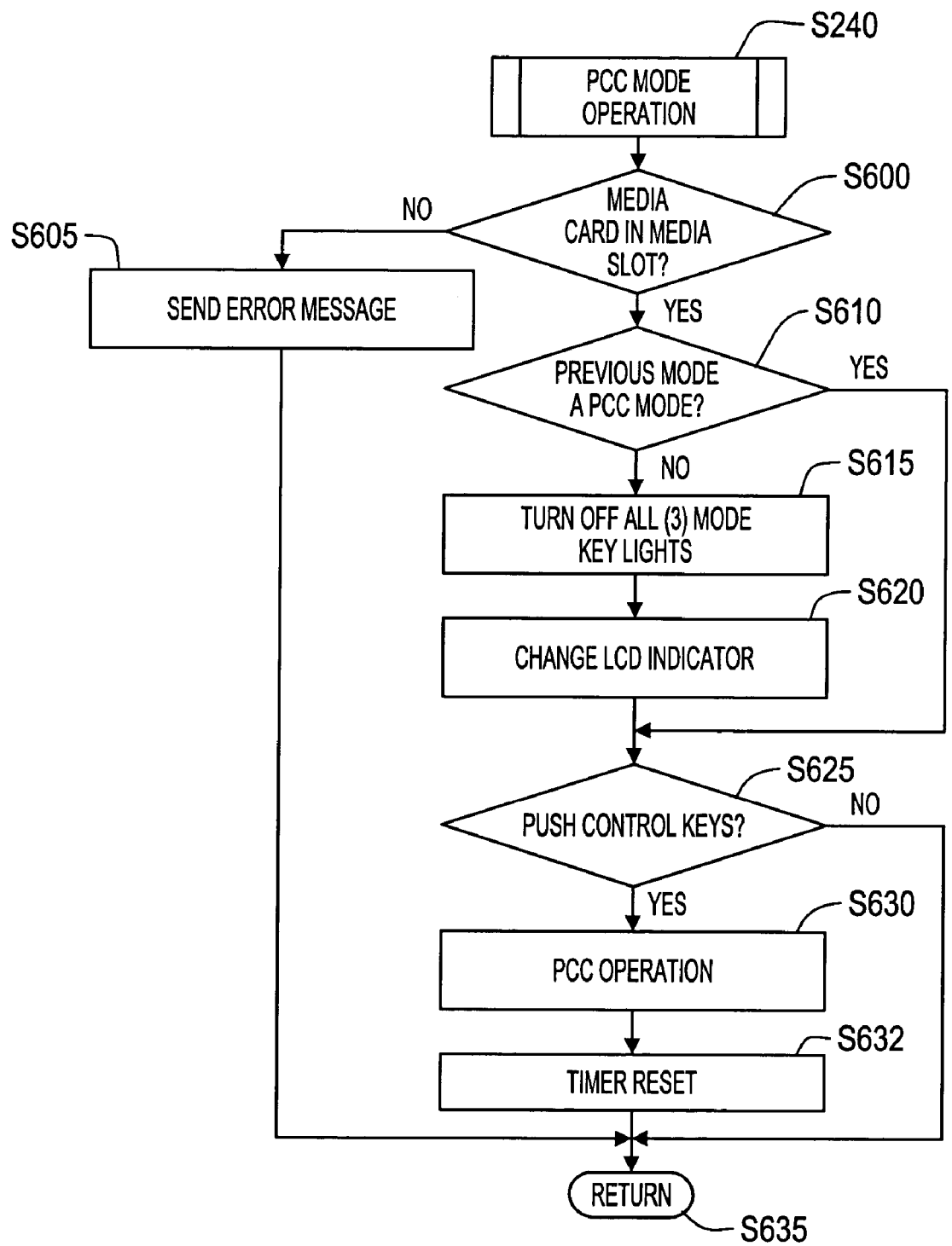
FIG. 13 is a flowchart outlining the photocapture processing performed in the mode selection processing of FIG. 9.

FIG. 13 illustrates a subroutine used to perform the Pcc mode operation of step S240. The operation proceeds to step S600 where a determination is made as to whether a media card has been inserted into the media slot 130. If a media card has not been inserted (S600:No), the operation proceeds to step S605 where an error message is displayed on the LCD 210 in order to indicate that a media card has not been inserted and thus a Pcc operation can not be performed. Otherwise (S600:Yes), the operation proceeds to step S610.

In step S610, a determination is made as to whether the multifunction device 100 was previously in a Pcc mode. If the multifunction device 100 was previously in the Pcc mode (S610:Yes), the operation proceeds to step S625. Otherwise the operation proceeds to step S615.

In step S615, the access lights for all of the copy function key 202, the fax function key 204 and the scan function key 206 are turned off, if either one was previously turned on, and the access light for the photocapture function key 206 is turned on. As should be appreciated, the access light for the photocapture function key 208 should be on based on the determination in step S600. Then, in step S620, the LCD 210 is changed to display data relevant to the Pcc mode. The operation then proceeds to step S625.

In step S625, a determination is made as to whether any of the control keys on the operating panel 210, excluding the copy function key 202, the fax function key 204, the scan copy key 206 and the photocapture function key 208, have been pressed in order to initiate a Pcc operation. In other words, a determination is made as to whether an operator wants to download data from the media card. If the operator presses the control keys (S625:Yes), the operation proceeds to step S630 where a Pcc operation is performed. Then, in step S632, the timer is reset to zero. Otherwise, (S625:No), the operation returns at step S635 to step S245 of FIG. 9.

Returning to step S130 of FIG. 8, a determination is made as to whether a first predetermined time has passed after an operation or after a function key has been pressed. In other words, a determination is made as to whether the time has reached the first predetermined time. As should be appreciated, the first predetermined time is longer than the second predetermined time of step S220. If the first predetermined time has passed (S130:Yes), the operation returns to step S105. Otherwise, (S130:No), the operation returns to step S125. In other words, if an operation has not been performed or a function key has not been pressed for an extended period of time, the operation returns to the initial fax mode where the access light for the fax function key 204 is turned on and the access light for the copy function key 202 and the scan function key 206 is turned off.

As should be appreciated, the second predetermined time is shorter than the first predetermined time. For example in FIG. 9, when it is determined that the second predetermined time has passed (S222:Yes), the operation proceeds to step S225 in order to reset the copy settings to the default copy settings. Then, the operation proceeds to step S245 where the operation returns to step S130 of FIG. 8. The LCD 210 maintains the default copy settings until it has been determined in step S130 that the first predetermine time has passed. When the first predetermined time has passed (S130:Yes), the settings on the LCD 210 are reset from the default copy settings to the fax standby settings in step S105.

As should be appreciated, the second predetermined time can be set to a time longer than the first predetermined time. An operator can set both the first predetermined time and the second predetermined time based on the operator's preference. If an operator sets the second predetermined time longer than the first predetermined time, the timer for the second predetermined time does not work and only timer for the first predetermined time works. As such, the first predetermined time has priority because the first time for the first predetermined time should be working all the time.

Although the invention has been described in detail and with reference to the specific embodiments thereof, it would be apparent to those skilled in the art that various changes, arrangements and modifications may be applied therein without departing from the spirit and scope of the invention.

What is claimed is:

1. A multifunction device, comprising:
a body;
a media slot placed on the body and which receives a media card; and
a control panel including a media card indicator that illuminates when a media card has been inserted into the media slot, wherein the media card indicator and the media slot are on different planes;
wherein pressing of the media card indicator places the control panel in a mode to download and print data from the media card.

2. The multifunction device of claim 1, wherein a cover is placed on the body.

3. The multifunction device of claim 2, wherein the control panel and the media card indicator are provided on the body.

4. The multifunction device of claim 1, wherein the control panel extends from the body.

5. The multifunction device of claim 1, wherein the multifunction device is a flat bed multifunction device, comprising:
the body that includes an image forming apparatus in which an image can be formed on a recording medium, the control panel and the media card indicator; and
a cover that includes an image reading device that reads an image recorded on a document, wherein the cover is placed on a surface of the body.

6. The multifunction device of claim 1, wherein the media card indicator blinks when data is retrieved from the media card.

7. A multifunction device, comprising:
a body;
a media slot placed on the body and which receives a media card; and
a control panel including a media card indicator that illuminates when a media card has been inserted into the media slot, wherein the media card indicator and the media slot are on different planes;
wherein the multifunction device can perform at least one of a copy function, a fax function or a scan function, at least one of the copy function, the fax function or the scan function includes an indicator, and the control panel is in a mode to download data from the media card when the indicator is off.

8. A multifunction device, comprising:
a body;
a media slot placed on the body and which receives a media card; and
a control panel including a media card indicator that illuminates when a media card has been inserted into the media slot, wherein the media card indicator and the media slot are on different planes;
wherein the multifunction device can perform a copy function, a fax function and a scan function, the control panel includes a copy function key that initiates the copy function, a fax function key that initiates the fax function and a scan function key that initiates the scan function, with a function key associated with a least used function placed between two function keys.

9. A multifunction device, comprising:
a body;
a media slot placed on the body and which receives a media card; and
a control panel including a media card indicator that illuminates when a media card has been inserted into the media slot, wherein the media card indicator and the media slot are on different planes;
wherein the multifunction device can perform a copy function, a fax function and a scan function, the control panel includes a copy function key that illuminates during the copy function, a fax function key that illuminates during the fax function and a scan function key that illuminates during the scan function, with the copy function key, the fax function key and the scan function key turned off when the media card indicator is pressed.

10. A multifunction device, comprising:
a body;
a media slot placed on the body and which receives a media card;
a control panel including a media card indicator that illuminates when a media card has been inserted into the media slot, wherein pressing of the media card indicator places the control panel in a mode to download and print data from the media card.

11. The multifunction device of claim 10, wherein a cover is placed on the body.

12. The multifunction device of claim 11, wherein the control panel and the media card indicator are provided on the body.

13. The multifunction device of claim 10, wherein the control panel extends from the body.

14. The multifunction device of claim 10, wherein the multifunction device is a flat bed multifunction device, comprising:
   the body that includes an image forming apparatus in which an image can be formed on a recording medium, the control panel and the media card indicator; and
   a cover that includes an image reading device that reads an image recorded on a document, wherein the cover is placed on a surface of the body.

15. The multifunction device of claim 10, wherein the media card indicator blinks when data is retrieved from the media card.

16. The multifunction device of claim 10, wherein multifunction device can perform at least one of a copy function, a fax function or a scan function, at least one of the copy function, the fax function or the scan function includes an indicator, and the control panel is in a mode to download data from the media card when the indicator is off.

17. The multifunction device of claim 10, wherein the multifunction device can perform a copy function, a fax function and a scan function, the control panel includes a copy function key that initiates the copy function, a fax function key that initiates the fax function and a scan function key that initiates the scan function, with a function key associated with a least used function placed between two function keys.

18. The multifunction device of claim 10, wherein the multifunction device can perform a copy function, a fax function and a scan function, the control panel includes a copy function key that illuminates during the copy function, a fax function key that illuminates during the fax function and a scan function key that illuminates during the scan function, with the copy function key, the fax function key and the scan function key turned off when the media card indicator is pressed.

* * * * *